F. G. BOERCKER.
FEEDING MECHANISM FOR NUT MACHINES AND THE LIKE.
APPLICATION FILED JULY 9, 1920.
1,370,511.
Patented Mar. 8, 1921.
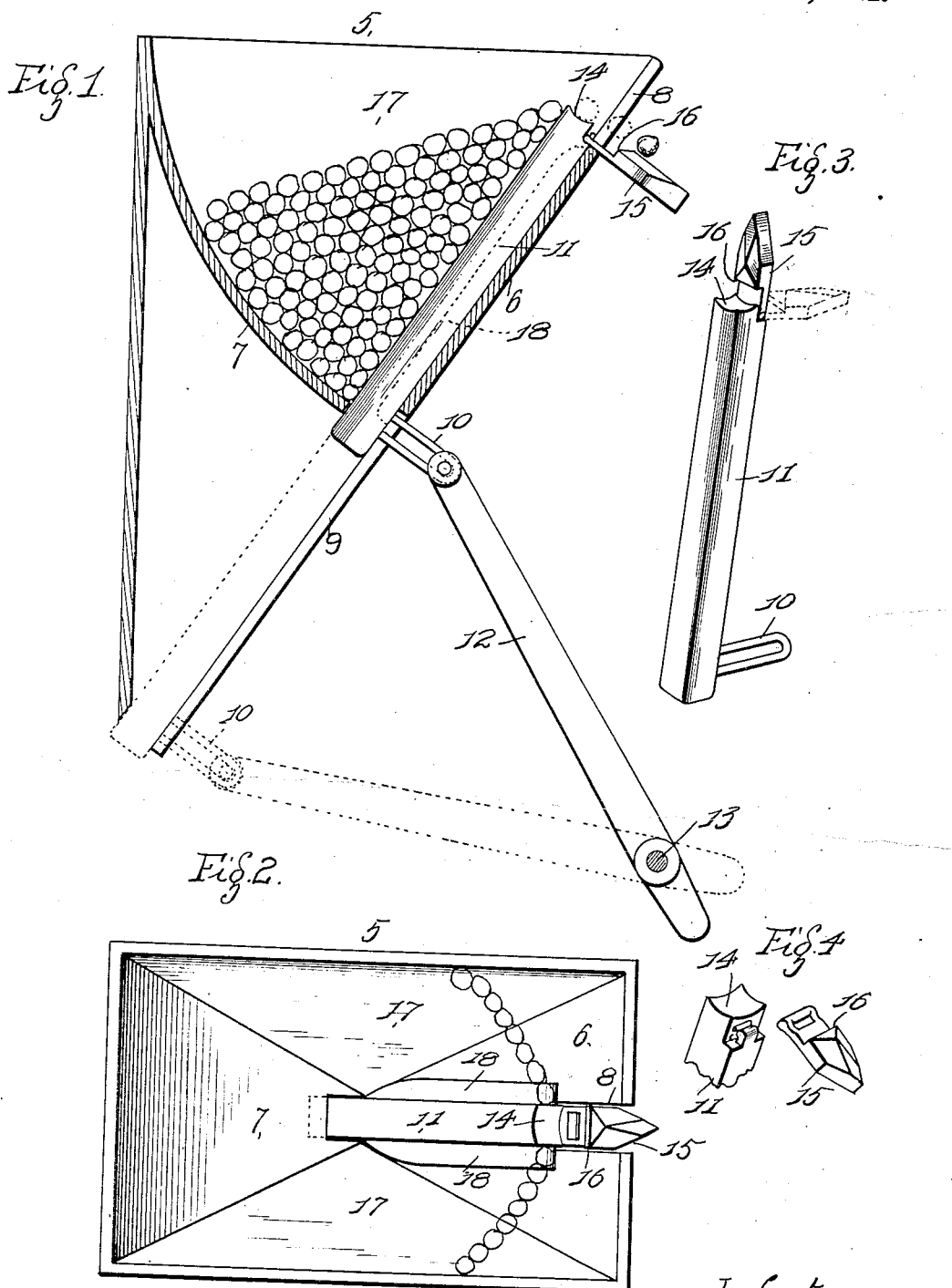
Inventor
Frederick G. Boercker

UNITED STATES PATENT OFFICE.

FREDERICK G. BOERCKER, OF ST. LOUIS, MISSOURI.

FEEDING MECHANISM FOR NUT-MACHINES AND THE LIKE.

1,370,511. Specification of Letters Patent. Patented Mar. 8, 1921.

Application filed July 9, 1920. Serial No. 394,930.

*To all whom it may concern:*

Be it known that I, FREDERICK G. BOERCKER, a citizen of the United States, and resident of St. Louis, Missouri, have invented certain new and useful Improvements in Feeding Mechanism for Nut-Machines and the like, of which the following is a specification.

This invention relates to improvements in a feeding mechanism for nut machines and the like, and has for its object a reciprocating bar operating in a hopper with a reciprocating mechanism to deliver from the hopper a single nut and to pass it into a separate machine where the same is cracked and the kernel extracted.

The mechanism may also be used for counting articles such as olives and the like.

Figure 1, is a sectional view of a hopper showing my invention in operating position therein.

Fig. 2, is a top plan view.

Fig. 3, is a detail perspective view of the feeding bar made use of.

Fig. 4, is a detail perspective view of the upper portion of the bar with its hinged head detached.

In the drawings 5 indicates a hopper having an inclined side 6, and a curved bottom 7, the inclined wall 6 has its upper portion cut-away and formed into a slot 8, the lower end of the wall is provided with a slot 9 through which projects a loop 10 attached to and forming a part of the feeding bar 11. To the loop 10 is pivotally connected an arm 12 which is mounted on the operating shaft 13, which shaft is placed in a rocking movement by any suitable mechanism.

The upper end of the feeding bar 11, is provided with a concave surface 14, and to the bottom side of the bar beneath the concave surface is hingedly attached a head 15, this head is pointed and so shaped as to press aside the nuts located in the hopper while the feeding bar is being elevated, one nut lodging on the concave surface and is gripped thereon by the shoulder 16, forming a part of the head, and while the bar reaches its highest movement the hinged head will automatically fall down through the slot 8 and allow the nut carried on the concave surface to drop out and feed itself into the cracking machine.

The nuts are fed into the hopper 5 from any suitable source of supply and in order that only one nut is fed at a time the side walls 17 of the hopper are inclined toward the bottom allowing one nut to lodge upon the concave surface and as before stated the rest in the hopper are pressed aside by the advancement of the pointed head.

The bar 11 is guided between a pair of guide bars 18 formed on the inside of the inclined wall 6, the lowest movement of the feeding bar being illustrated by dotted lines in Fig. 1.

The device is preferably used in machines where nuts are removed from the hopper one at a time and placed into an additional machine whereby the nut is cracked and the kernel removed, it can likewise be removed for counting articles and automatically removing the same from the hopper in which they are placed.

Having fully described my invention what I claim is:

1. A feeding mechanism comprising a hopper, a bar located therein, a hinged pointed head carried by the upper end of the bar and in close relation with a concave surface formed on the bar, and an arm for reciprocating the feeding bar, substantially as specified.

2. A device of the character described comprising a rectangular bar, the upper end provided with a concave surface, a hinged pointed head attached to said bar at its upper end adjacent to the concave surface, a loop projecting from the bar, a link connecting the said loop for raising and lowering the bar in combination with a hopper in which the feeding bar is reciprocated for removing nuts and like articles from the hopper and placing it out of the same, substantially as specified.

In testimony whereof, I have signed my name to this specification, in presence of two subscribing witnesses.

FREDERICK G. BOERCKER.

Witnesses:
ALFRED A. EICKS,
B. M. AUSTIN.